US012748844B2

(12) United States Patent
Sahu

(10) Patent No.: US 12,748,844 B2
(45) Date of Patent: Sep. 29, 2026

(54) SOURCE CODE VULNERABILITY DETECTION USING DEEP LEARNING

(71) Applicant: Optum, Inc., Minnetonka, MN (US)

(72) Inventor: Monika Sahu, Gurgaon (IN)

(73) Assignee: Optum, Inc., Minnetonka, MN (US)

(*) Notice: Subject to any disclaimer, the term of this patent is extended or adjusted under 35 U.S.C. 154(b) by 353 days.

(21) Appl. No.: 18/191,455

(22) Filed: Mar. 28, 2023

(65) Prior Publication Data

US 2024/0330455 A1 Oct. 3, 2024

(51) Int. Cl.
*G06F 21/56* (2013.01)
*G06F 21/57* (2013.01)
*G06N 20/00* (2019.01)

(52) U.S. Cl.
CPC .......... *G06F 21/563* (2013.01); *G06F 21/577* (2013.01); *G06F 2221/033* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,817,604 B1* | 10/2020 | Kimball | ................ | G06F 21/563 |
| 2007/0074177 A1* | 3/2007 | Kurita | ....................... | G06F 8/75 717/127 |
| 2021/0256426 A1 | 8/2021 | Calvano | | |
| 2022/0004642 A1 | 1/2022 | Pujar et al. | | |
| 2022/0292200 A1 | 9/2022 | Zou et al. | | |
| 2023/0177170 A1* | 6/2023 | Olson | .................... | G06N 20/00 726/25 |
| 2024/0265101 A1* | 8/2024 | Sydow | ...................... | G06F 8/42 |

FOREIGN PATENT DOCUMENTS

| | | |
|---|---|---|
| CN | 111753303 A | 10/2020 |
| CN | 113672931 A | 11/2021 |

OTHER PUBLICATIONS

"CVE Program," The Mitre Corporation, (1999), (2 pages), (online), [Retrieved from the Internet Jun. 12, 2023] <URL: https://cve.mitre.org/.

(Continued)

*Primary Examiner* — Syed A Roni
(74) *Attorney, Agent, or Firm* — Alston & Bird LLP

(57) ABSTRACT

Various embodiments of the present disclosure provide methods, apparatus, systems, computing devices, computing entities, and/or the like for detecting and locating vulnerabilities in source code. The method comprises receiving one or more source code files, matching source code from the one or more source code files to one or more program slices by parsing the source code and mapping one or more portions of the source code to the one or more program slices, wherein each of the one or more program slices comprises one or more program statements associated with one or more vulnerabilities, and generating, using a predictive machine learning model, a vulnerability prediction for each of the one or more source code files, the vulnerability prediction comprising one or more locations of vulnerable code in the source code based on the matching and a vulnerability class associated with each location of vulnerable code.

20 Claims, 13 Drawing Sheets

(56) References Cited

OTHER PUBLICATIONS

"National Vulnerability Database," National Institute of Standards and Technology, (2018), (3 pages), [Retrieved from the Internet Jun. 12, 2023] <URL: https://nvd.nist.gov/>.
"NIST Software Assurance Reference Dataset," National Institute of Standards and Technology, U.S. Department of Commerce, (2018), (2 pages), [Retrieved from the Internet Jun. 12, 2023] <URL: https://samate.nist.gov/SRD/index.php>.
Cheng, Xiao et al. "DeepWukong: Statically Detecting Software Vulnerabilities Using Deep Graph Neural Network,". ACM Transactions on Software Engineering and Methodology (TOSEM), vol. 1, No. 1, Article 1, Jan. 2020, pp. 30, No. 3, Apr. 23, 2021, pp. 1-32, DOI: 10.1145/3436877.
Lerch, Johannes. "On the Scalability of Static Program Analysis to Detect Vulnerabilities in the Java Platform," Technical University of Darmstadt, Doctoral Dissertation, May 24, 2016, (135 pages), available online: https://core.ac.uk/download/pdf/76650939.pdf.
Li, Zhen et al. "SySeVR: A Framework for Using Deep Learning to Detect Software Vulnerabilities," arXiv preprint arXiv: 1807.06756v3 [cs.LG], Jan. 12, 2021, pp. 1-15, available online: https://arxiv.org/pdf/1807.06756.pdf.
Li, Zhen et al. "VulDeeLocator: A Deep Learning-Based Fine-Grained Vulnerability Detector," arXiv preprint arXiv:2001.02350v2 [cs.CR], May 1, 2021, pp. 1-17, available online: https://arxiv.org/pdf/2001.02350.pdf.
Li, Zhen et al. "VulDeePecker: A Deep Learning-Based System For Vulnerability Detection," Network and Distributed Systems Security (NDSS) Sympsium 201, Feb. 18-21, 2018, pp. 1-15, DOI: 10.14722/ndss/2018.23158.
Mahmood, Rahma et al. "Evaluation of Static Analysis Tools for Finding Vulnerabilities in Java and c/c++ Source Code," arXiv preprint arXiv:1805.09040, May 23, 2018, pp. 1-7, available online: https://arxiv.org/ftp/arxiv/papers/1805/1805.09040.pdf.
Sintaha, Mifta et al. "Katana: Dual Slicing-Based Context for Learning Bug Fixes," ACM Transactions on Software Engineering and Methodology (TOSEM), vol. 1, No. 1, Jun. 2, 2022, pp. 1-22, DOI: 10.1145.nnnnnnn.nnnnnnn.
Tip, Frank. "A Survey of Program Slicing Techniques," Journal of Programming Languages, vol. 3, (1995), pp. 121-189, available online: https://www.franktip.org/pubs/jpl1995.pdf.
Wang, Lu et al. "PreNNsem: A Heterogeneous Ensemble Learning Framework for Vulnerability Detection in Software," Applied Sciences, vol. 10, No. 22:7954, Nov. 10, 2020, pp. 1-17m DOI: 10.3390/app10227954.
Wichmann, B.A. et al. "Industrial Perspective on Static Analysis," Software Engineering Journal, vol. 10, pp. 69-75, Mar. 1995, available online: https://www.researchgate.net/profile/William-Marsh-2/publication/3407322_Industrial_perspective_on_static_analysis/links/540999660cf2187a6a7004cb/Industrial-perspective-on-static-analysis.pdf.
Wu, Jiajie. "Literature Review on Vulnerability Detection Using NLP Technology," arXiv preprint arXiv:2104.11230v1 [cs.CR], Apr. 23, 2021, (10 pages), available online: https://arxiv.org/pdf/2104.11230.pdf.
Zagane, Mohammad et al. "Deep Learning for Software Vulnerabilities Detection Using Code Metrics," IEEE Access, vol. 8, Apr. 17, 2020, pp. 74562-74570, DOI: 10.1109/ACCESS.2020.2988557.

* cited by examiner

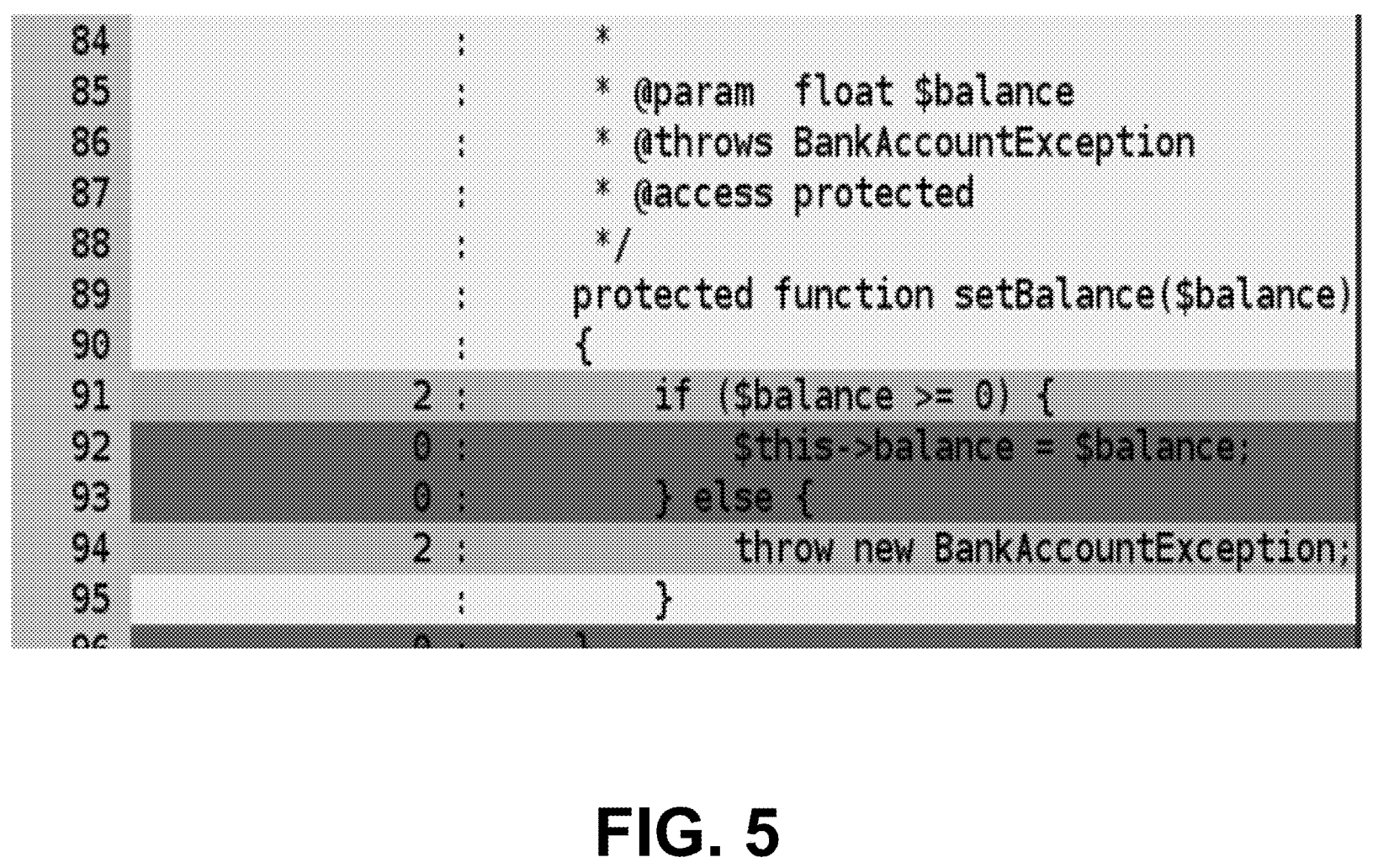

```
  :  *
  :  * @param  float $balance
  :  * @throws BankAccountException
  :  * @access protected
  :  */
  :  protected function setBalance($balance)
  :  {
2 :      if ($balance >= 0) {
0 :          $this->balance = $balance;
0 :      } else {
2 :          throw new BankAccountException;
  :      }
```

FIG. 5

1200

| A | B | C | D |
|---|---|---|---|
| Program Statements (Text) | Label (Class) | Slice Line Numbers | Parent ID (Source Code File) |

FIG. 12

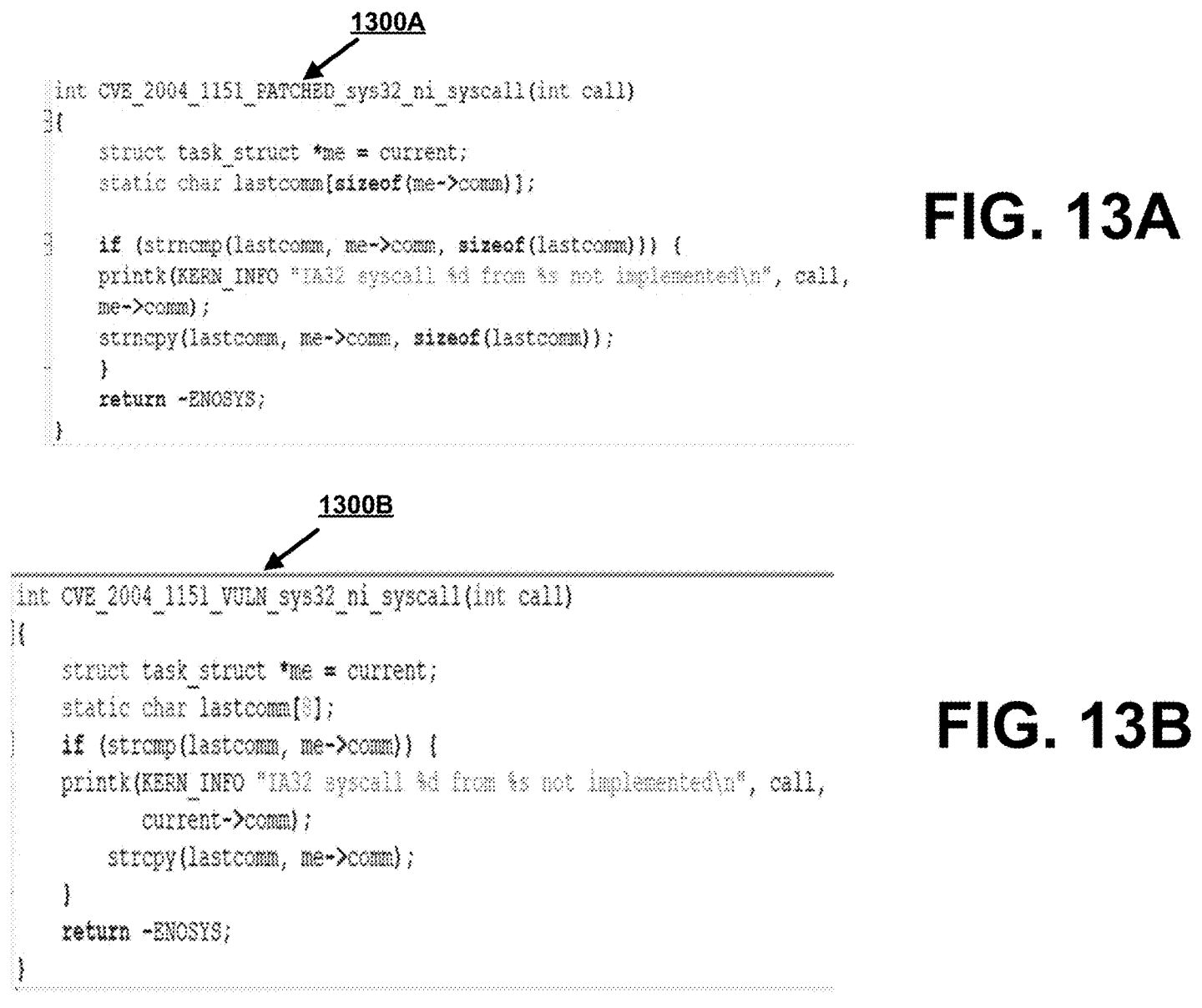

1300A

```
int CVE_2004_1151_PATCHED_sys32_ni_syscall(int call)
{
    struct task_struct *me = current;
    static char lastcomm[sizeof(me->comm)];

    if (strncmp(lastcomm, me->comm, sizeof(lastcomm))) {
    printk(KERN_INFO "IA32 syscall %d from %s not implemented\n", call,
    me->comm);
    strncpy(lastcomm, me->comm, sizeof(lastcomm));
    }
    return -ENOSYS;
}
```

FIG. 13A

1300B

```
int CVE_2004_1151_VULN_sys32_ni_syscall(int call)
{
    struct task_struct *me = current;
    static char lastcomm[8];
    if (strcmp(lastcomm, me->comm)) {
    printk(KERN_INFO "IA32 syscall %d from %s not implemented\n", call,
          current->comm);
       strcpy(lastcomm, me->comm);
    }
    return -ENOSYS;
}
```

FIG. 13B

SOURCE CODE VULNERABILITY DETECTION USING DEEP LEARNING

BACKGROUND

Various embodiments of the present disclosure address technical challenges related to performing predictive data analysis and provide solutions to address the shortcomings of existing vulnerability scanning solutions.

BRIEF SUMMARY

In general, various embodiments of the present disclosure provide methods, apparatus, systems, computing devices, computing entities, and/or the like for detecting vulnerabilities in source code.

In some embodiments, a computer-implemented method comprises: receiving, by one or more processors, one or more source code files; for each of the one or more source code files, matching, by the one or more processors, source code from the one or more source code files to one or more program slices by parsing the source code and mapping one or more portions of the source code to the one or more program slices, wherein each of the one or more program slices comprises one or more program statements associated with one or more vulnerabilities; generating, by the one or more processors and using a predictive machine learning model, a vulnerability prediction for each of the one or more source code files, the vulnerability prediction comprising: (a) one or more locations of vulnerable code in the source code based on the matching, and (b) a vulnerability class associated with each location of vulnerable code, wherein: (i) the predictive machine learning model is trained based on a training dataset, and (ii) the training dataset is generated by: (1) receiving one or more training source code files and one or more vulnerability classes associated with the one or more training source code files, (2) receiving one or more syntax features for each of the one or more vulnerability classes, (3) determining a program slicing criterion based on the one or more syntax features, (4) extracting the one or more program slices from the one or more training source code files based on the program slicing criterion, and (5) labeling the one or more program slices with the one or more vulnerability classes; and initiating, by the one or more processors, the performance of one or more prediction-based actions based on the vulnerability prediction. In some embodiments, the performance of one or more prediction-based actions may comprise an identification of one or more of: (i) program statement declaration classes, functions, or files, (ii) program statement types, and (iii) line numbers.

In some embodiments, a computing apparatus comprising memory and one or more processors communicatively coupled to the memory, the one or more processors configured to: receive one or more source code files; for each of the one or more source code files, match source code from the one or more source code files to one or more program slices by parsing the source code and mapping one or more portions of the source code to the one or more program slices, wherein each of the one or more program slices comprises one or more program statements associated with one or more vulnerabilities; generate, using a predictive machine learning model, a vulnerability prediction for each of the one or more source code files, the vulnerability prediction comprising: (a) one or more locations of vulnerable code in the source code based on the matching, and (b) a vulnerability class associated with each location of vulnerable code, wherein: (i) the predictive machine learning model is trained based on a training dataset, and (ii) the training dataset is generated by: (1) receiving one or more training source code files and one or more vulnerability classes associated with the one or more training source code files, (2) receiving one or more syntax features for each of the one or more vulnerability classes, (3) determining a program slicing criterion based on the one or more syntax features, (4) extracting the one or more program slices from the one or more training source code files based on the program slicing criterion, and (5) labeling the one or more program slices with the one or more vulnerability classes; and initiate the performance of one or more prediction-based actions based on the vulnerability prediction. In some embodiments, the performance of one or more prediction-based actions may comprise an identification of one or more of: (i) program statement declaration classes, functions, or files, (ii) program statement types, and (iii) line numbers.

In some embodiments, one or more non-transitory computer-readable storage media including instructions that, when executed by one or more processors, cause the one or more processors to receive one or more source code files; for each of the one or more source code files, match source code from the one or more source code files to one or more program slices by parsing the source code and mapping one or more portions of the source code to the one or more program slices, wherein each of the one or more program slices comprises one or more program statements associated with one or more vulnerabilities; generate, using a predictive machine learning model, a vulnerability prediction for each of the one or more source code files, the vulnerability prediction comprising: (a) one or more locations of vulnerable code in the source code based on the matching, and (b) a vulnerability class associated with each location of vulnerable code, wherein: (i) the predictive machine learning model is trained based on a training dataset, and (ii) the training dataset is generated by: (1) receiving one or more training source code files and one or more vulnerability classes associated with the one or more training source code files, (2) receiving one or more syntax features for each of the one or more vulnerability classes, (3) determining a program slicing criterion based on the one or more syntax features, (4) extracting the one or more program slices from the one or more training source code files based on the program slicing criterion, and (5) labeling the one or more program slices with the one or more vulnerability classes; and initiate the performance of one or more prediction-based actions based on the vulnerability prediction. In some embodiments, the performance of one or more prediction-based actions may comprise an identification of one or more of: (i) program statement declaration classes, functions, or files, (ii) program statement types, and (iii) line numbers.

BRIEF DESCRIPTION OF THE DRAWINGS

FIG. 5 provides an operation example of an output of a prediction-based action in accordance with some embodiments of the present disclosure.

FIG. 13A and FIG. 13B provide operational examples of program statements for data cleaning in accordance with some embodiments discussed herein.

DETAILED DESCRIPTION

Figure 1:
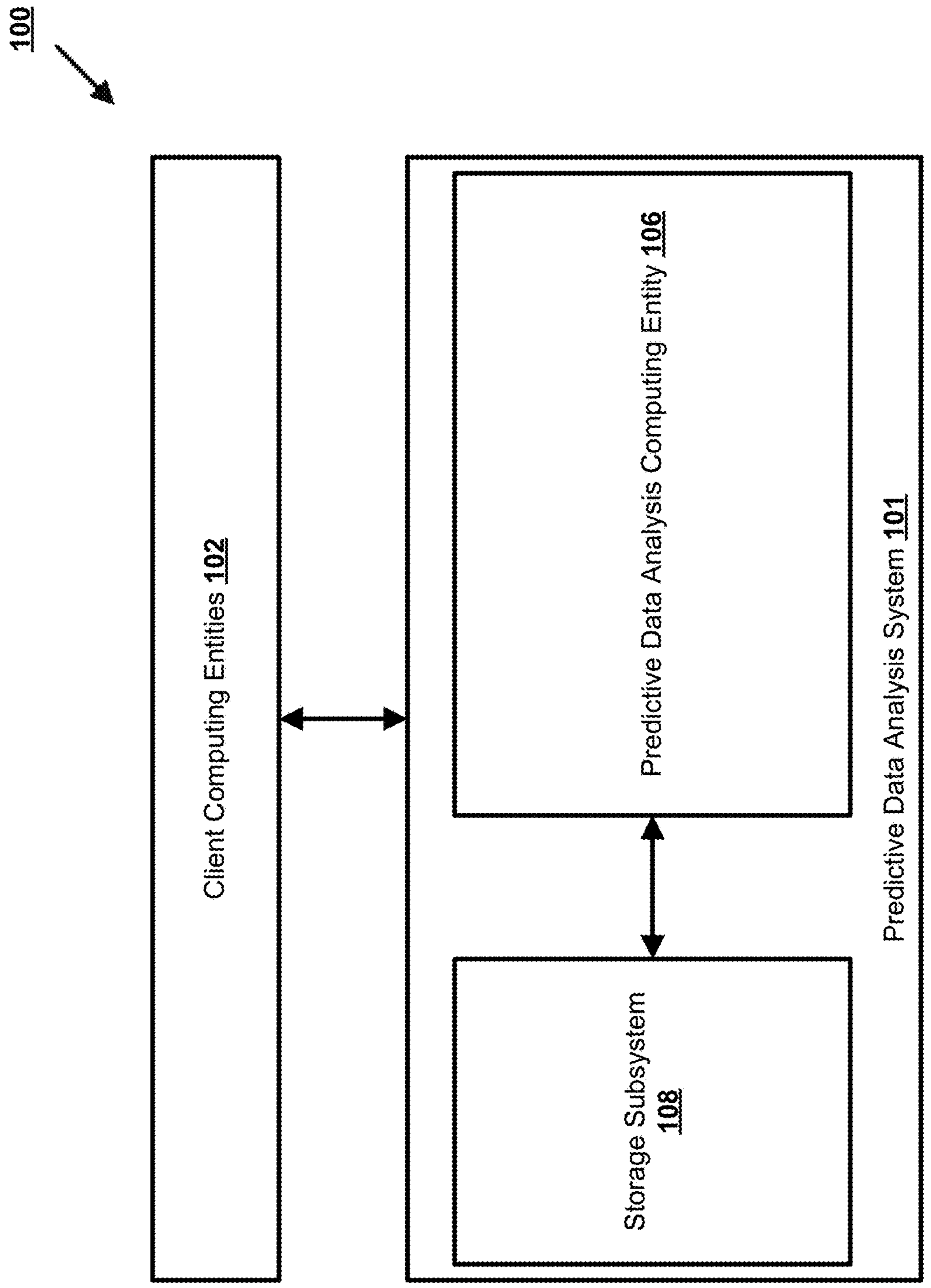
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 is a schematic diagram of an example architecture 100 for performing predictive data analysis. The architecture 100 includes a predictive data analysis system 101 configured to receive predictive data analysis requests (e.g., comprising a request to analyze one or more source code files) from client computing entities 102, process the predictive data analysis requests to generate predictions, provide the generated predictions to the client computing entities 102, and automatically initiate performance of prediction-based actions based on the generated predictions.

An example of a prediction-based action that can be performed using the predictive data analysis system 101 comprises receiving a request for detecting vulnerabilities in a source code file and displaying a vulnerability prediction for the source code file on a user interface. Other examples of prediction-based actions comprise generating a diagnostic report, displaying/providing resources, generating action scripts, generating alerts, or generating one or more electronic communications based on the vulnerability prediction.

In accordance with various embodiments of the present disclosure, a predictive machine learning model may be trained to predict the presence of vulnerabilities in software program source code files. The predictive machine learning model may be trained based on static analysis of training source code files and program slicing to identify semantically relevant source code contributing to vulnerabilities. As such, syntax and rich semantics of training source code files may be captured and used to detect multiclass vulnerabilities and locate precise locations of vulnerabilities in source code with precision. This technique will lead to higher accuracy (e.g., lower false alarm rates) of performing vulnerability predictive operations needed for source code deployed in systems comprising sensitive information. In doing so, the techniques described herein improve efficiency, accuracy, and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically initiate performance of prediction-based actions based on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Example Predictive Data Analysis Computing Entity

Figure 2:
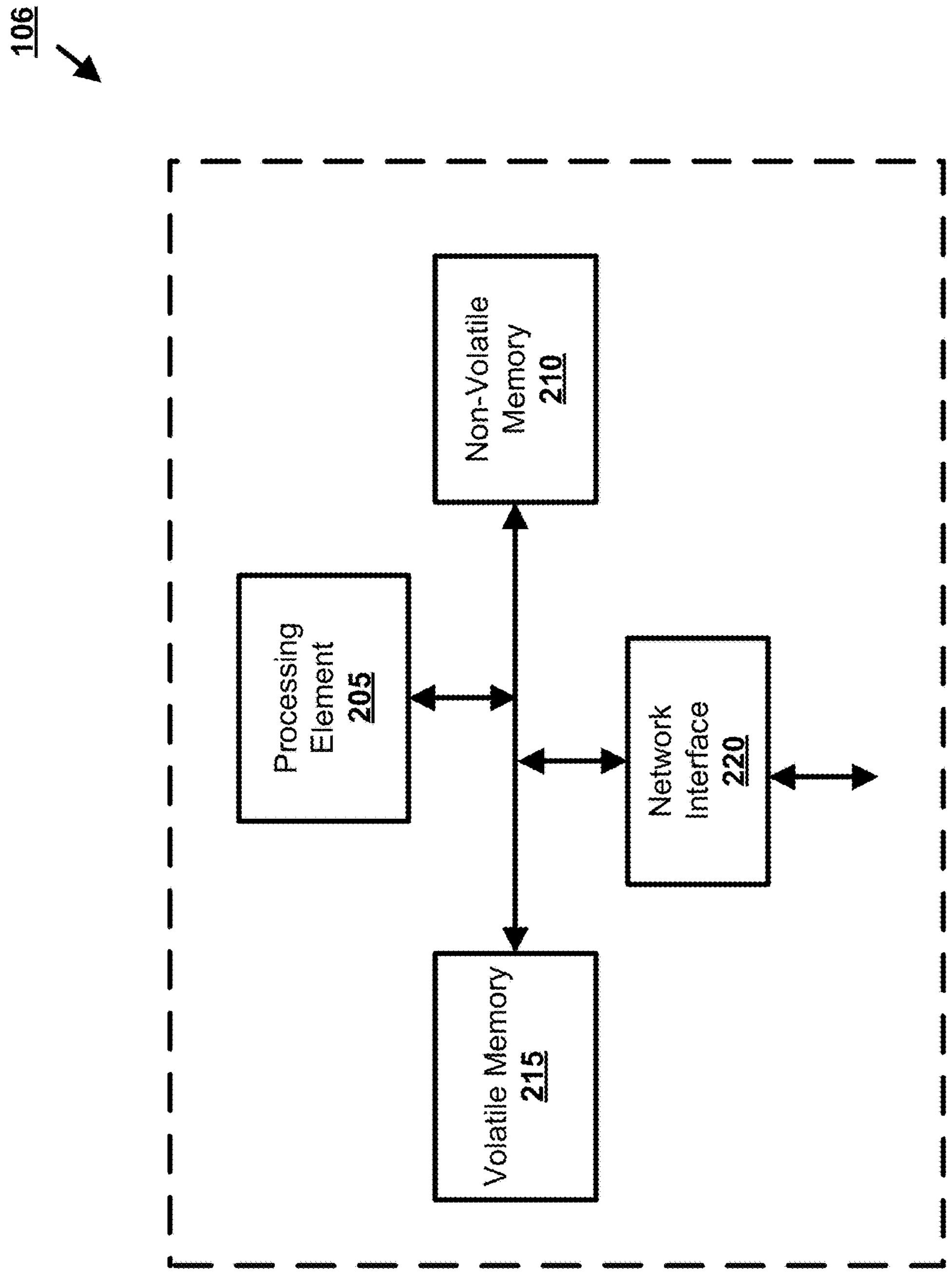
FIG. 2 provides an example predictive data analysis computing entity in accordance with some embodiments of the present disclosure.

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably.

As indicated, in some embodiments, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in some embodiments, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the predictive data analysis computing entity 106 may further include, or be in communication with, non-volatile media (also referred to as non-volatile storage, memory, memory storage, memory circuitry and/or similar terms used herein interchangeably). In some embodiments, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the predictive data analysis computing entity 106 may further include, or be in communication with, volatile media (also referred to as volatile storage, memory, memory storage, memory circuitry and/or similar terms used herein interchangeably). In some embodiments, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in some embodiments, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Example Client Computing Entity

Figure 3:
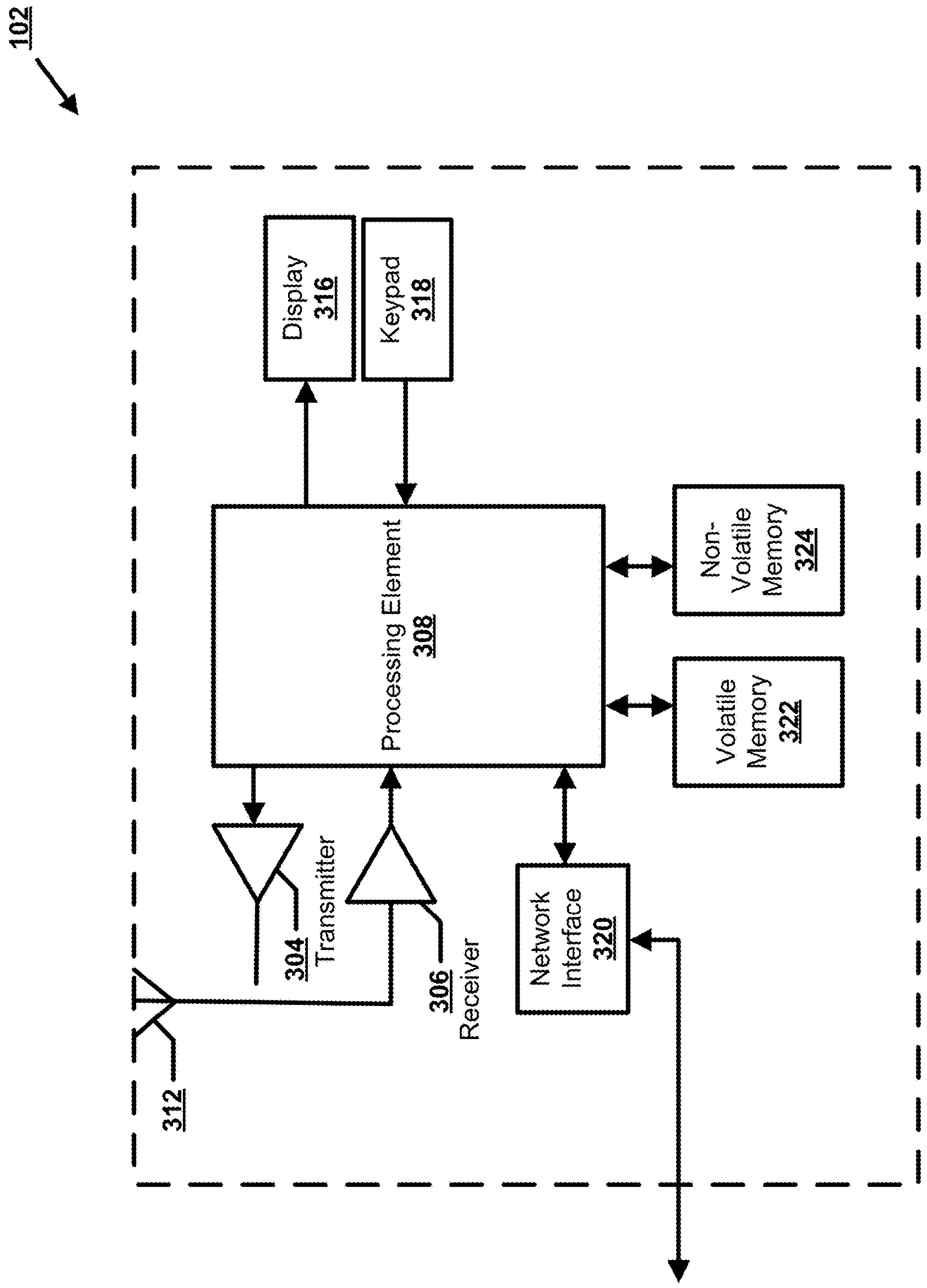
FIG. 3 provides an example client computing entity in accordance with some embodiments of the present disclosure.

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile memory 322 and/or non-volatile memory 324, which can be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for example purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "source code file" may refer to a computer resource comprising a storage of source code within a given data format. A source code file may comprise a data format capable of being extracted of source code (e.g., via a compiler) for conversion into an executable program or instructions that may be executed by one or more processors of a computing device. For example, a source code file may be used to generate a software application or parts of a software application configured to perform one or more functions.

In some embodiments, the term "source code" may refer to program instructions written in a human-readable programming language that specify actions to be performed by a program executed by a computer. For example, the source code may comprise variables and functions that may be defined or configured to perform certain functions in a program.

In some embodiments, the term "vulnerability detection machine learning model framework" may refer to a data construct that describes parameters, hyperparameters, and/or defined operations of a machine learning model that is configured to match source code from each of one or more source code files to one or more program slices by parsing the source code and mapping one or more portions of the source code to the one or more program slices, and generate a vulnerability prediction for each of one or more source code files. A vulnerability detection machine learning model framework may comprise a pre-trained natural language processing model and a predictive machine learning model. The pre-trained natural language processing model may be used to represent a training dataset as vectors to be provided as input to the predictive machine learning model.

In some embodiments, the term "vulnerability prediction" may refer to a data construct that describes an output generated by a vulnerability detection machine learning model framework comprising one or more precise locations of vulnerable code in source code and a vulnerability class associated with each precise location of vulnerable code. The one or more precise locations of vulnerable code may be determined based on matching of source code from source code files to one or more program slices.

In some embodiments, the term "vulnerability" or "vulnerable code" may refer to program instructions comprising defects that pose risk of being exploited. A program comprising a vulnerability or vulnerable code, when executed by a computing system may result in the computing system being susceptible to malicious attacks. A vulnerability or vulnerable code may also lead to a computing system and/or data handled by the computing being compromised, stolen, hacked, copied, and/or altered.

In some embodiments, the term "predictive machine learning model" may refer to a data construct that describes parameters, hyperparameters, and/or defined operations of a machine learning model that is configured to classify vulnerable code in one or more source code files matched to one or more program slices. As an example, vulnerable code may be assigned one of a plurality of vulnerability classes retrieved from a vulnerability database. According to various embodiments of the present disclosure, a predictive machine learning model may comprise a deep learning model based on a neural network architecture including, for example, a full connection layer and a SoftMax layer to generate a prediction result. A predictive machine learning model may be trained based on a training dataset. A training dataset (e.g., comprising labeled program slices) may be represented as vectors comprising syntax and semantic information and provided as input to a predictive machine learning model. A training dataset may be provided to a predictive machine learning model as a vector representation (e.g., of each labeled program slice) by using a pre-trained natural language processing model, such as a robustly optimized bidirectional encoder representations from transformers approach (RoBERTa) model. Training a predictive machine learning model may further comprise calculating a sparse categorical cross entropy loss function by using label information from the training dataset and adjusting neural network parameters according to error backpropagation until the response of the neural network to input reaches a preset target range.

In some embodiments, the term "training dataset" may refer to a data construct that describes data that may be used to train a predictive machine learning model. According to various embodiments of the present disclosure, a training dataset may comprise one or more program slices assigned with labels associated with one or more vulnerability classes. In some embodiments, a training dataset may be generated by: (i) receiving one or more training source code files and one or more vulnerability classes associated with the one or more training source code files, (ii) receiving one or more syntax features for each of the one or more vulnerability classes, (iii) determining a program slicing criterion based on the one or more syntax features, (iv) extracting one or more program slices from the one or more training source code files based on the program slicing criterion, and (v) labeling the one or more program slices with the one or more vulnerability classes. In some embodiments, one or more program slices extracted from one or more training source code files may be cleaned or scrubbed of semantic information (e.g., to avoid machine learning model analysis of descriptive names rather than functionality) by replacing names of functions and variables in the one or more program slices with symbolic names.

In some embodiments, the term "training source code file" may refer to a computer resource comprising source code associated with test case information that is stored within a given data format. A training source code file may be used to create a training dataset used to train a predictive machine learning model.

In some embodiments, the term "program slice" may refer to a data construct that describes portions of source code that are relevant to a value of a selected set of variables at some selected point in a program (e.g., program slicing criterion). According to various embodiments of the present disclosure, program slices may comprise an extraction of one or more program statements from source code known to be semantically associated with one or more vulnerabilities. For example, a program slice may comprise one or more program statements from one or more training source code files. The one or more training source code files may be associated with test case information retrieved from a vulnerability database. As such, extracting one or more program slices may comprise generating a source code subset based on a program slicing criterion associated with potential vulnerability candidates identified from the one or more training source code files. A program slice may comprise a source code subset comprising one or more program statements that may or may not contribute to one or more vulnerabilities (e.g., potential vulnerability candidates). That is, certain program slices may represent source code that is semantically relevant to one or more vulnerabilities and other program slices may represent source code that is not semantically relevant to vulnerabilities. Extracting one or more program slices may comprise performing either a forward slice, or a backward slice. A forward may comprise program statements which may be affected by a program slicing criterion. A backward slice may comprise program statements which might affect a program slicing criterion.

In some embodiments, the term "program slicing criterion" may refer to a data construct that describes a point of interest including set of variables whose value a program slice should preserve. Determining a program slicing criterion may comprise determining one or more potential vulnerability candidates comprising one or more program statements by performing static analysis on one or more program statements associated with one or more training source code files and matching the one or more program statements associated with the one or more training source code files with one or more syntax features associated with one or more vulnerability classes.

In some embodiments, the term "static analysis" may refer to a process for analyzing source code files to identify potential vulnerability candidates. Static analysis may comprise generating, for each of one or more training source code files, at least one of: a program dependency graph (DDG), a data dependency graph (PDG), and a control dependency graph (CDG).

In some embodiments, the term "vulnerability class" may refer to a data construct that describes a label associated with a type of vulnerability. A vulnerability class may be assigned to program slices in a training dataset to train a predictive machine learning model. A vulnerability class may also be generated as an output (e.g., a vulnerability prediction) of a multiclass classification performed by a predictive machine learning model. In some embodiments, vulnerability classes may be defined for one or more training source code files in a vulnerability database.

In some embodiments, the term "syntax feature" may refer to a data construct that describes syntax characteristics, application programming interface (API) or library calls, array declarations, pointer declarations, or operators in expression.

IV. OVERVIEW, TECHNICAL IMPROVEMENTS, AND TECHNICAL ADVANTAGES

Various embodiments of the present disclosure make important technical contributions to improving vulnerability scanning systems by using a predictive machine learning model-based system that is trained to detect multiclass vulnerabilities and locate precise locations of vulnerabilities in source code based on identification and capture of syntax and rich semantics of source code. This approach improves training speed and training efficiency of training predictive machine learning models used in vulnerability scanning systems. It is well-understood in the relevant art that there is typically a tradeoff between predictive accuracy and training speed, such that it is trivial to improve training speed by reducing predictive accuracy. Thus, the real challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, accuracy and/or speed of training machine learning models.

For example, various embodiments of the present disclosure improve predictive accuracy of predictive machine learning models used in vulnerability scanning systems by extracting program slices from source code and representing the program slices as vectors comprising syntax and semantic information. As described herein, traditional vulnerability scanning systems do not focus on source code semantics and leverage minimum semantic information induced by source code. In particular, existing vulnerability scanning systems, such as supervised learning-based systems, use labeled training data to search for same or similar patterns on a test/field data. Such supervised learning-based systems are limited to binary classification (e.g., whether a vulnerability exists or not) and are unable to determine what type of vulnerability is present. However, it is desirable for a vulnerability scanning system to be able to perform multi-class classification not just for a vulnerability due to a specific pattern but also for other vulnerabilities including patterns that may not have been previously encountered. Other existing vulnerability scanning systems, such as deep learning-based systems, are limited to searching for vulnerabilities related to API or third-party library calls. Accordingly, vulnerabilities are not limited to API or third-party library calls, and may also be found in other areas in the source code, such as arrays and pointers.

However, in accordance with various embodiments of the present disclosure, a predictive machine learning model may be trained to predict the presence of vulnerabilities in software program source code files. The predictive machine learning model may be trained based on static analysis of training source code files and program slicing to identify semantically relevant source code contributing to vulnerabilities. As such, syntax and rich semantics of training source code files may be captured and used to detect multiclass vulnerabilities and locate precise locations of vulnerabilities in source code with precision. In some embodiments, the presence of data imbalances in training the predictive machine learning model may also be addressed by selecting vulnerable and non-vulnerable code for each class of vulnerability, considering a vulnerable to non-vulnerable sample ratio, and generating class weights. This technique will lead to higher accuracy (e.g., lower false alarm rates) of performing vulnerability predictive operations needed for source code deployed in systems comprising sensitive information. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models.

Moreover, various embodiments of the present disclosure make important technical contributions to improving resource-usage efficiency of post-prediction systems by using hybrid reason code predictions to set the number of allowed computing entities used by the noted post-prediction systems. For example, in some embodiments, a predictive data analysis computing entity determines V vulnerability classifications for S source code data objects based on the S source code-wide embedded representations for the S document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the S source code data objects. For example, in some embodiments, the number of computing entities needed to perform post-prediction processing operations (e.g., automated investigation operations) with respect to S source code data objects can be determined based on the output of the equation:

$$R = \text{ceil}\left(\sum_{k}^{k=K} ur_k\right),$$

where R is the predicted number of computing entities needed to perform post-prediction processing operations with respect to the S source code data objects, ceil(.) is a ceiling function that returns the closest integer that is greater than or equal to the value provided as the input parameter of the ceiling function, k is an index variable that iterates over K source code data objects among the S source code data objects that are associated with affirmative classifications, and $ur_k$ is the estimated resource utilization ratio for a kth source code data objects that may be determined based on a count of functions/variables/in the kth source code data object. In some embodiments, once R is generated, the predictive data analysis computing entity can use R to perform operational load balancing for a server system that is configured to perform post-prediction processing operations (e.g., automated investigation operations) with respect to S source code data objects. This may be done by allocating computing entities to the post-prediction processing operations if the number of currently-allocated computing entities is below R, and deallocating currently-allocated computing entities if the number of currently-allocated computing entities is above R.

V. EXAMPLE SYSTEM OPERATIONS

As indicated, various embodiments of the present disclosure make important technical contributions to improving vulnerability scanning systems by using a predictive machine learning model-based system that is trained to detect multiclass vulnerabilities and locate precise locations of vulnerabilities in source code based on identification and capture of syntax and rich semantics of source code. This approach improves training speed and training efficiency of training predictive machine learning models used in vulnerability scanning systems. It is well-understood in the relevant art that there is typically a tradeoff between predictive accuracy and training speed, such that it is trivial to improve training speed by reducing predictive accuracy. Thus, the real challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, accuracy and/or speed of training machine learning models.

Figure 4:
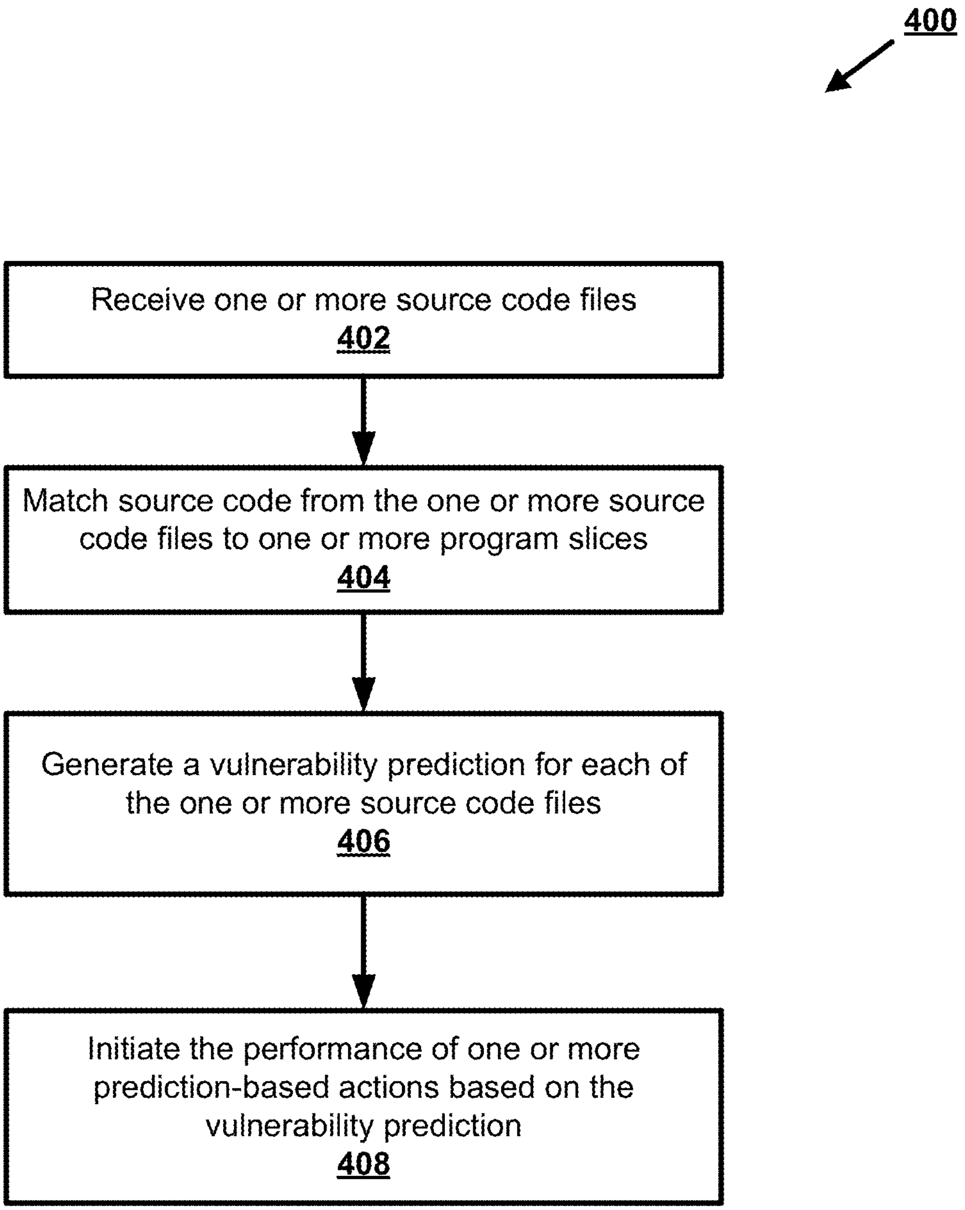
FIG. 4 is a flowchart diagram of an example process for performing predictive operations on an input comprising one or more source code files in accordance with some embodiments of the present disclosure.

FIG. 4 is a flowchart diagram of an example process 400 for performing predictive operations on an input comprising one or more source code files. In some embodiments, via the various steps/operations of the process 400, the predictive data analysis computing entity 106 comprising a vulnerability detection machine learning framework may be configured to match input source code to program slices, identify precise locations in the input source code comprising vulnerable code and classify the vulnerable code.

In some embodiments, the process 400 begins at step/operation 402 when the predictive data analysis computing entity 106 receives one or more source code files. The one or more source code files may be received as a request to analyze the one or more source code files for vulnerable code.

In some embodiments, a source code file describes a computer resource comprising a storage of source code within a given data format. A source code file may comprise a data format capable of being extracted of source code (e.g., via a compiler) for conversion into an executable program or instructions that may be executed by one or more processors of a computing device. For example, a source code file may be used to generate a software application or parts of a software application configured to perform one or more functions. In some embodiments, source code describes program instructions written in a human-readable programming language that specify actions to be performed by a program executed by a computer. For example, the source code may comprise variables and functions that may be defined or configured to perform certain functions in a program.

In some embodiments, a vulnerability or vulnerable code describes program instructions comprising defects that pose risk of being exploited. A program comprising a vulnerability or vulnerable code, when executed by a computing system may result in the computing system being susceptible to malicious attacks. A vulnerability or vulnerable code may also lead to a computing system and/or data handled by the computing being compromised, stolen, hacked, copied, and/or altered.

In some embodiments, at step/operation 404, the predictive data analysis computing entity 106, for each of the one or more source code files, matches source code from the one or more source code files to one or more program slices. A program slice may comprise an extraction of one or more program statements from source code based on a program slice criterion. Program slices are described in further detail with respect to the description of FIG. 6.

Accordingly, in some embodiments, via performing step/operation 404, the predictive data analysis computing entity 106 parses the source code from the one or more source code files and maps one or more portions of the source code to the one or more program slices. In some embodiments, matching the source code to the one or more program slices may be based on the following precedence: 1) program statement declaration class/function/file, 2) program statement type, and 3) program statement line number in a source code file.

In some embodiments, at step/operation 406, the predictive data analysis computing entity 106 generates, using a predictive machine learning model, a vulnerability prediction for each of the one or more source code files. In some embodiments, a vulnerability prediction describes an output generated by a vulnerability detection machine learning model framework comprising one or more precise locations of vulnerable code in source code and a vulnerability class associated with each precise location of vulnerable code. The one or more precise locations of vulnerable code may be determined based on matching of source code from source code files to one or more program slices. The one or more precise locations may be provided as line numbers in source code, specified program statement declaration class or function, an identifier of a source code file, and/or program statements in the source code.

In some embodiments, a predictive machine learning model describes parameters, hyperparameters, and/or defined operations of a machine learning model that is configured to classify vulnerable code in one or more source code files matched to one or more program slices. As an example, vulnerable code may be assigned one of a plurality of vulnerability classes retrieved from a vulnerability database. According to various embodiments of the present disclosure, a predictive machine learning model may comprise a deep learning model based on a neural network architecture including, for example, a full connection layer and a SoftMax layer to generate a prediction result.

In some embodiments, a predictive machine learning model is trained based on a training dataset. According to various embodiments of the present disclosure, a training dataset may comprise one or more program slices assigned with labels associated with one or more vulnerability classes. A training dataset (e.g., comprising labeled program slices) may be represented as vectors comprising syntax and semantic information and provided as input to a predictive machine learning model. A training dataset may be provided to a predictive machine learning model as a vector representation (e.g., of each labeled program slice) by using a pre-trained natural language processing model, such as a RoBERTa model. Training a predictive machine learning model may further comprise calculating a sparse categorical cross entropy loss function by using label information from the training dataset and adjusting neural network parameters according to error backpropagation until the response of the neural network to input reaches a preset target range.

In some embodiments, at step/operation 408, the predictive data analysis computing entity 106 initiates the performance of one or more prediction-based actions based on the respective vulnerability prediction generated for each of the one or more source code files. Initiating the performance of the one or more prediction-based actions comprises, for example, performing a resource-based action (e.g., allocation of resource), generating a diagnostic report, generating action scripts, updating a record or file, generating alerts or messages, or generating one or more electronic communications. The one or more prediction-based actions may further include displaying visual renderings of the aforementioned examples of prediction-based actions in addition to one or more precise locations of vulnerable code in source code of the one or more source code files and a vulnerability class associated with each precise location of vulnerable code using a prediction output user interface. In one example embodiment, the performance of one or more prediction-based actions may comprise an identification of one or more of: (i) program statement declaration classes, functions, or files, (ii) program statement types, and (iii) line numbers. In some embodiments, an operational example of an output generated by the one or more prediction-based actions is depicted in FIG. 5.

Figure 6:
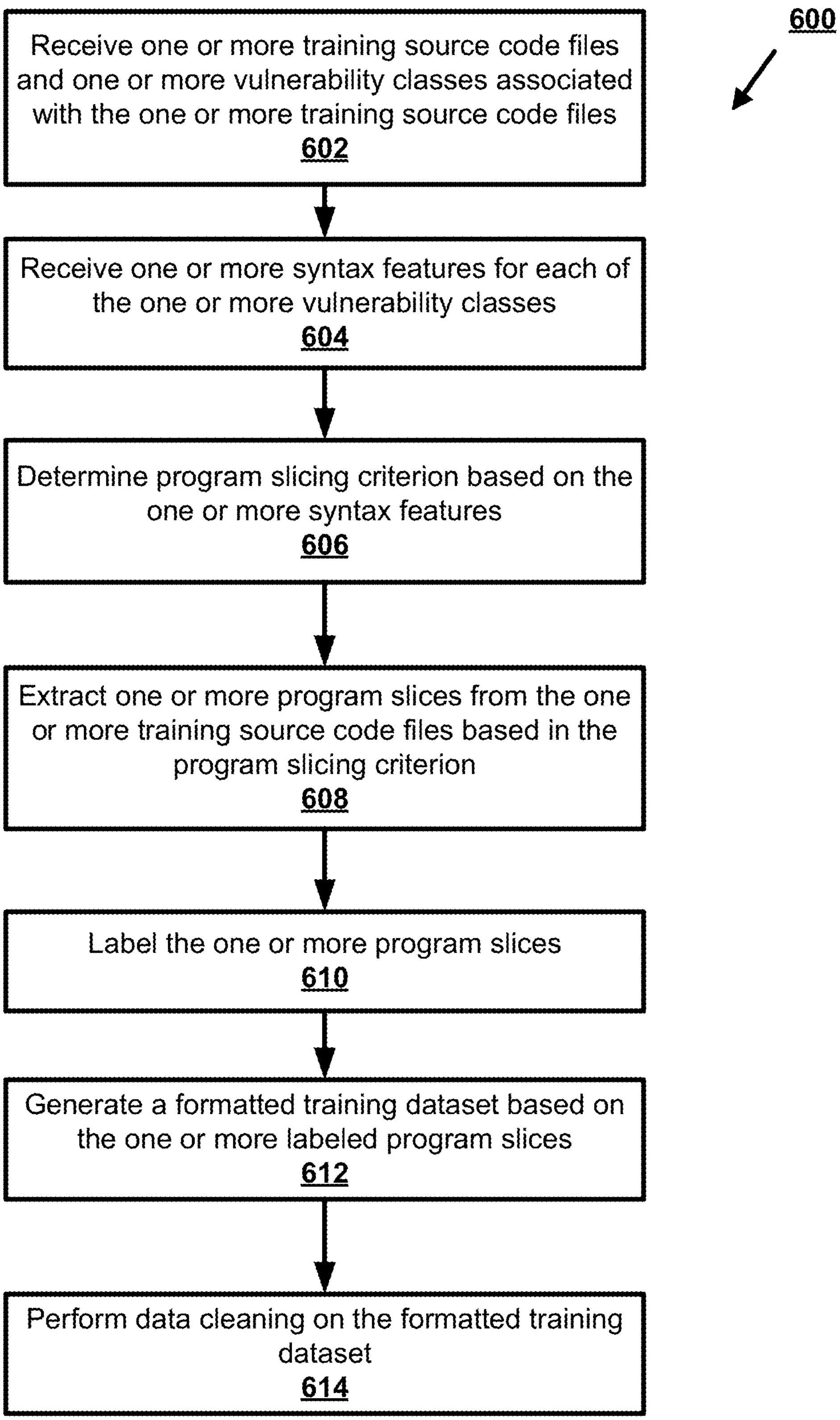
FIG. 6 is a flowchart diagram of an example process for generating a training dataset for training a predictive machine learning model in accordance with some embodiments of the present disclosure.

FIG. 6 is a flowchart diagram of an example process 600 for generating a training dataset for training a predictive machine learning model. In some embodiments, the process 600 begins at step/operation 602 when the predictive data analysis computing entity 106 receives one or more training source code files and one or more vulnerability classes associated with the one or more training source code files. The one or more training source code files and the one or more vulnerability classes may be received from one or more vulnerability databases, such as a national vulnerability database (NVD) and/or a software assurance reference database (SARD). The one or more vulnerability databases may include a systematic set of test case information comprising test programs in various programming languages associated with a plurality of vulnerability classes.

In some embodiments, a training source code file describes a computer resource comprising source code associated with test case information that is stored within a given data format. A training source code file may be used to create a training dataset used to train a predictive machine learning model.

In some embodiments, a vulnerability class describes a label associated with a type of vulnerability. A vulnerability class may be assigned to program slices in a training dataset to train a predictive machine learning model. A vulnerability class may also be generated as an output (e.g., a vulnerability prediction) of a multiclass classification performed by a predictive machine learning model.

In some embodiments, at step/operation 604, the predictive data analysis computing entity 106 receives one or more syntax features for each of the one or more vulnerability classes. The received syntax features may comprise, but are not limited to, a precompiled list of syntax characteristics of each type of vulnerability class, for example, vulnerability related to API/Library calls, vulnerabilities related to array declaration, vulnerabilities related to pointers, vulnerability related to operator in expression.

In some embodiments, at step/operation 606, the predictive data analysis computing entity 106 determines a program slicing criterion based on the one or more syntax features. In some embodiments, a program slicing criterion describes a point of interest including set of variables whose value a program slice should preserve. Determining the program slicing criterion may comprise determining one or more potential vulnerability candidates by performing static analysis on the one or more training source code files and matching the program statements of the source code files with the one or more syntax features. As such, program statements that match the one or more syntax features may be determined as potential vulnerability candidates. Potential vulnerability candidates may then be identified as program slicing criterion. It is noted that potential vulnerability candidates may be either non-vulnerable or vulnerable.

In some embodiments, static analysis describes a process for analyzing source code files to identify one or more program statements that contribute to one or more vulnerabilities. Static analysis may comprise generating, for each of one or more training source code files, at least one of: a DDG, a PDG, and a CDG.

Figure 7:
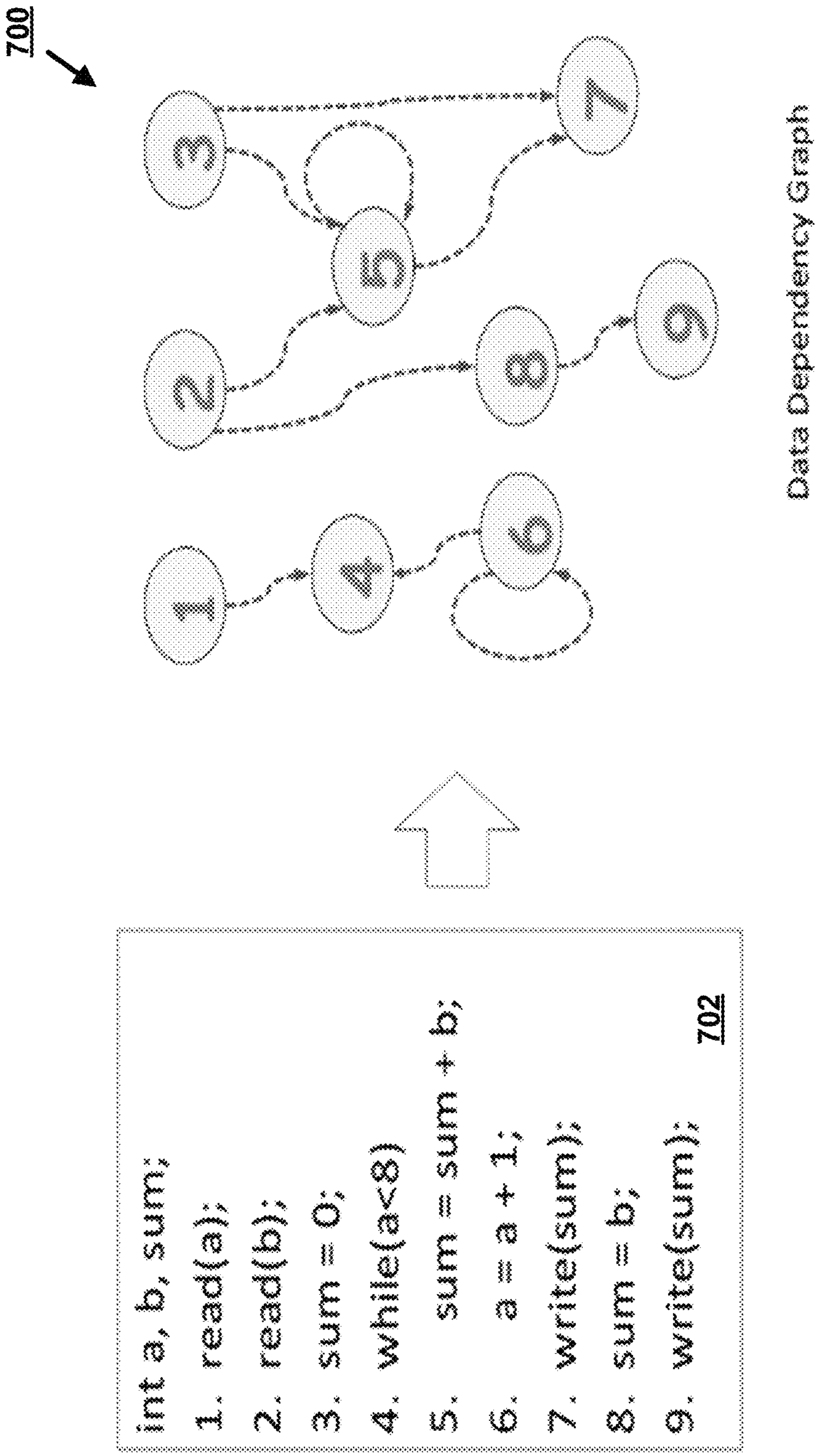
FIG. 7 provides an operational example of a data dependency graph in accordance with some embodiments discussed herein.

In some embodiments, a DDG comprises a data construct that describes a representation of data dependencies between individual program statements. In some embodiments, an operational example of a DDG is depicted in FIG. 7. As depicted in FIG. 7, DDG 700 comprises nodes associated with each program statement of source code 702 and edges representative of data dependencies between the program statements.

Figure 8:
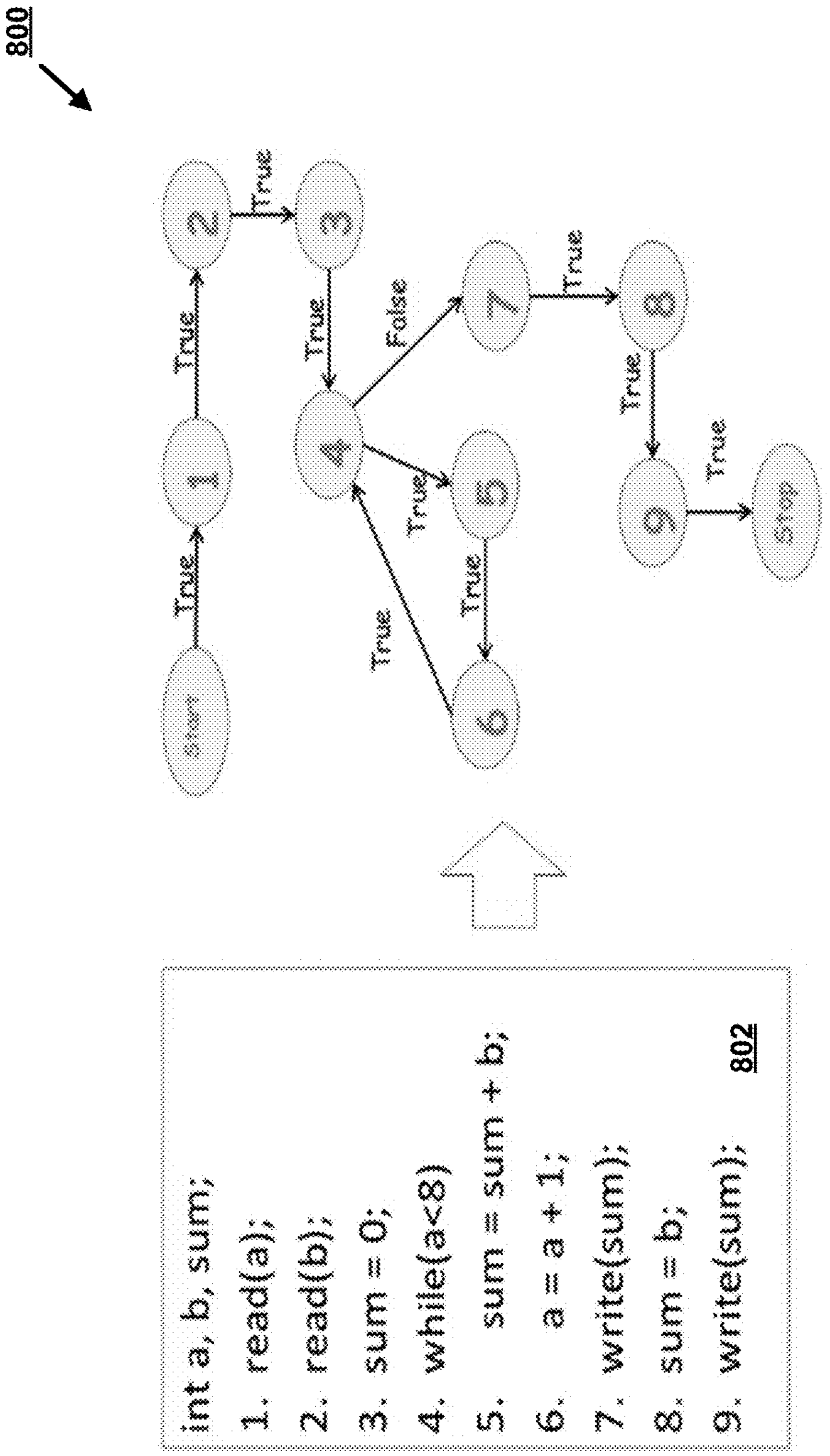
FIG. 8 provides an operational example of a control dependency graph in accordance with some embodiments discussed herein.

In some embodiments, a CDG comprises a data construct that describes a representation of control dependence of program statements. Control dependence may comprise a dependency in which a target program statement is executed based on a prior program statement. In some embodiments, an operational example of a CDG is depicted in FIG. 8. As depicted in FIG. 8, CDG 800 comprises nodes associated with each program statement of source code 802 and edges representative of control dependencies between the program statements.

Figure 9:
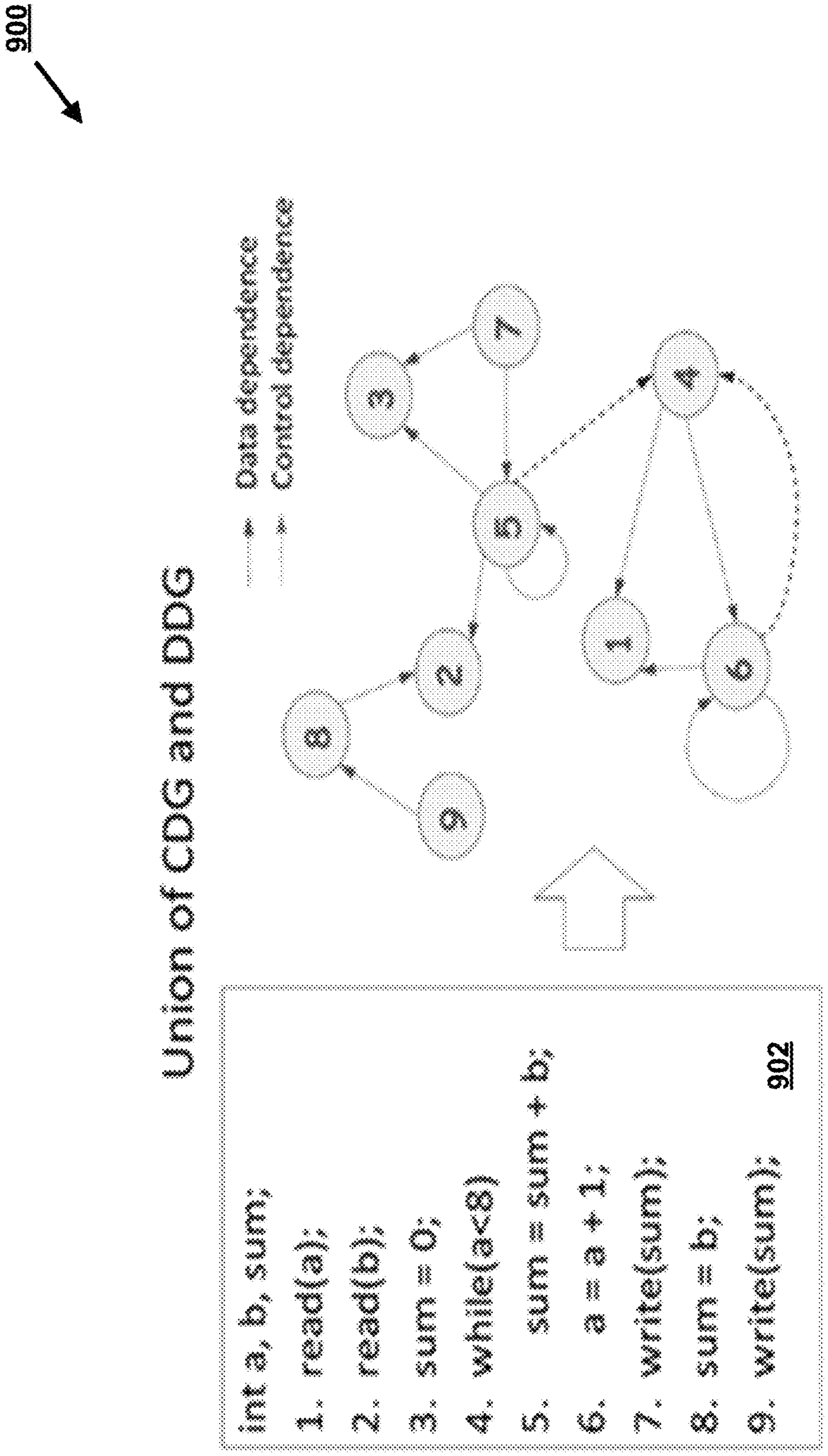
FIG. 9 provides an operational example of a program dependency graph in accordance with some embodiments discussed herein.

In some embodiments, a PDG comprises a data construct that describes a representation of data and control-flow dependencies between program statements. In some embodiments, a PDG may be generated based on a combination of a DDG and a CDG. In some embodiments, an operational example of a PDG is depicted in FIG. 9. As depicted in FIG. 9, PDG 900 comprises nodes associated with each program statement of source code 902, a first set of edges representative of data dependencies between the program statements, and a second set of edges representative of control dependencies between the program statements.

Returning to FIG. 6, in some embodiments, at step/operation 608, the predictive data analysis computing entity 106 extracts one or more program slices from the one or more training source code files based on the program slicing criterion. In some embodiments, a program slice describes portions of source code that are relevant to a value of a selected set of variables at some selected point in a program (e.g., program slicing criterion). According to various embodiments of the present disclosure, a program slice may be extracted from source code known to be semantically associated with one or more vulnerabilities. For example, extracting one or more program slices may comprise generating a source code subset based on a program slicing criterion associated with potential vulnerability candidates identified from the one or more training source code files.

In some embodiments, the one or more training source code files may be associated with test case information retrieved from a vulnerability database. A program slice may comprise a source code subset comprising one or more program statements that may or may not contribute to one or more vulnerabilities (e.g., potential vulnerability candidates). That is, certain program slices may represent source code that is semantically relevant to one or more vulnerabilities and other program slices may represent source code that is not semantically relevant to vulnerabilities. In some embodiments, a program slice may be identified as line numbers of each program statement in the program slice extracted from a source code file.

Figure 10:
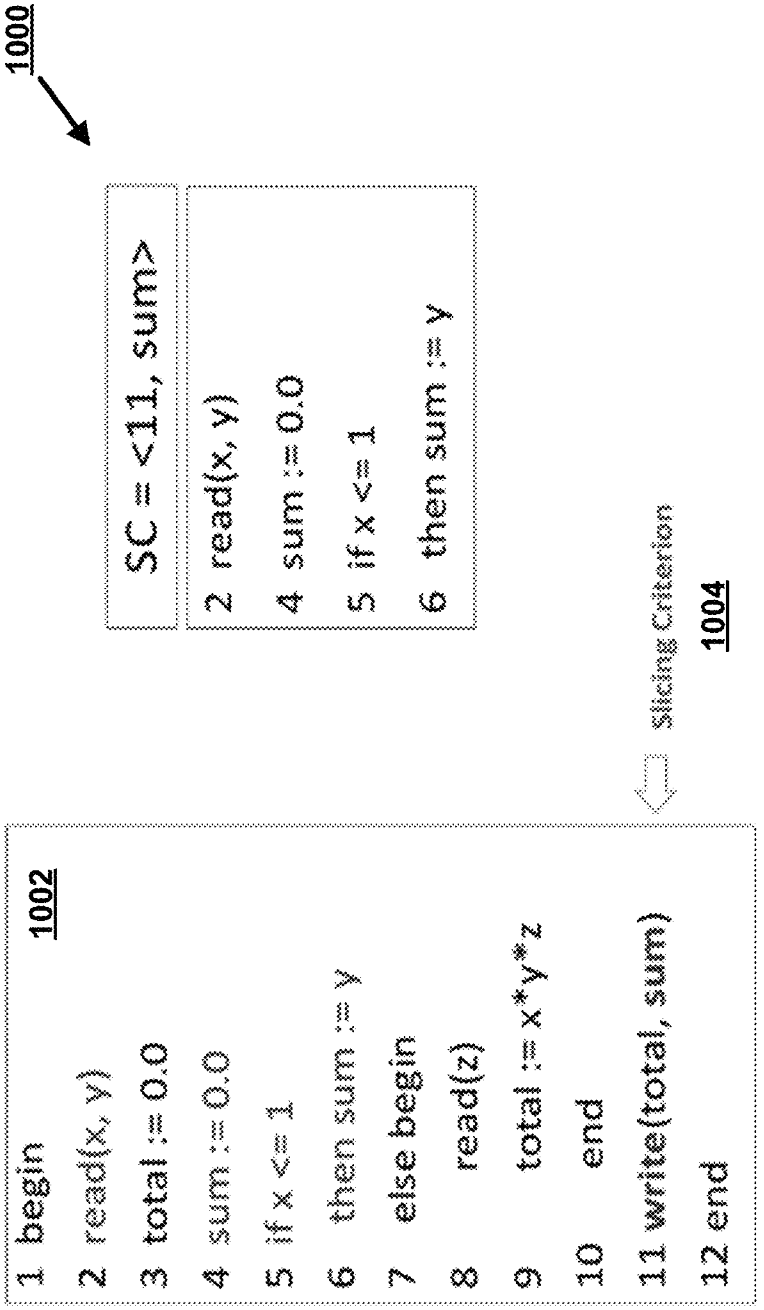
FIG. 10 provides an operational example of a program slice in accordance with some embodiments discussed herein.

In some embodiments, an operational example of a program slice 1000 is depicted in FIG. 10. As depicted in FIG. 10, in some embodiments, program slice 1000 may be extracted from source code 1002 based on slicing criterion 1004.

Figure 11:
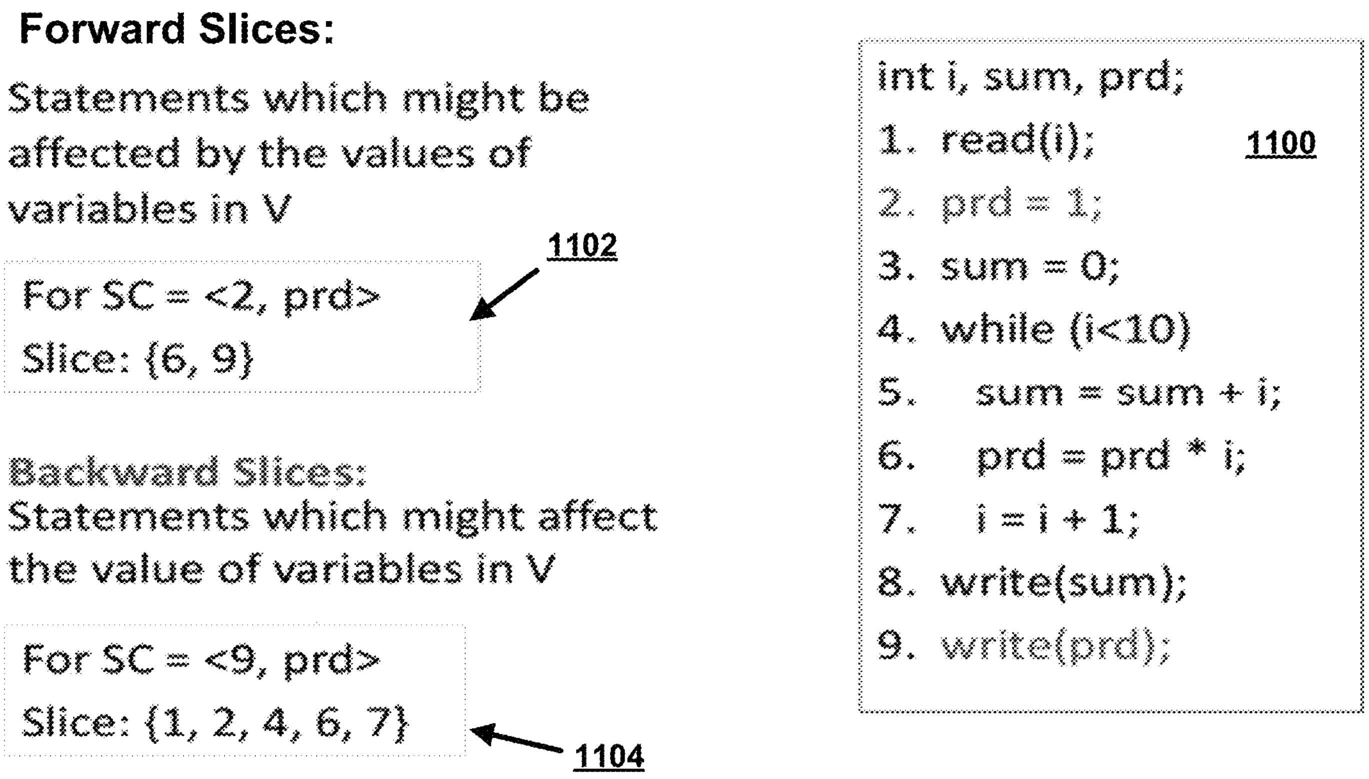
FIG. 11 provides operational examples of a forward slice and a backward slice FIG. 12 provides an operational example of a training dataset format in accordance with some embodiments discussed herein.

In some embodiments, extracting one or more program slices comprises performing either a forward slice or a backward slice. A forward may comprise program statements which may be affected by a program slicing criterion. A backward slice may comprise program statements which might affect a program slicing criterion. In some embodiments, operational examples of a forward slice 1102 and a backward slice 1104 extracted from source code 1100 are depicted in FIG. 11.

As such, a combination of static analysis (DDG, a PDG, and a CDG), and program slicing (forward and backward slicing) may capture the rich semantics of a plurality of program source codes used for training a predictive machine learning model to detect multiclass vulnerabilities and locate precise locations of vulnerabilities in source code.

Returning to FIG. 6, in some embodiments, at step/operation 610, the predictive data analysis computing entity 106 labels the one or more program slices based on test case information from the vulnerability database. As discussed above, the one or more vulnerability classes may be defined for one or more training source code files in the vulnerability database. Accordingly, the one or more program slices may be labeled based on test case information associated with the one or more training source code files from which the one or more program slices were extracted from. The one or more program slices may be labeled as either non-vulnerable, or as vulnerable via a vulnerability class identifier based on the test case information from the vulnerability database.

In some embodiments, at step/operation 612, the predictive data analysis computing entity 106 generates a formatted training dataset based on the one or more labeled program slices. The formatted training dataset may comprise a data format including fields for each program slice entry. In some embodiments, an operational example of a training dataset format 1200 is depicted in FIG. 12. As depicted in FIG. 12, in some embodiments, training dataset format 1200 comprises fields associated with program statements of a program slice, a label (e.g., of a vulnerability class), line numbers of the program statements (of the program slice), and an identifier of a parent source code file.

In some embodiments, data imbalances in training the predictive machine learning model may be prevented by selecting vulnerable and non-vulnerable code for each class of vulnerability in the training dataset, considering a vulnerable to non-vulnerable sample ratio, and generating class weights, e.g., to prevent training the predictive machine learning model to overpredict more frequent classes of vulnerabilities.

Returning to FIG. 6, in some embodiments, at step/operation 614, the predictive data analysis computing entity 106 performs data cleaning on the formatted training dataset. Data cleaning may comprise replacing names of functions and variables in program statements of the one or more program slices with symbolic names. Data cleaning of the formatted training dataset may remove any "noise" that may be present in the formatted training dataset. For example, certain semantic information, such as keywords may be removed such that they are not confused for actual vulnerabilities (e.g., to reduce false positives) when used to train a predictive machine learning model. In some embodiments, operational examples of program statements 1300A and 1300B where keywords, such as "PATCHED" and "VULN" depicted in FIG. 13A and FIG. 13B, respectively, may be replaced with symbolic names such as "FUNCTION_1" and "FUNCTION_2," respectively.

The disclosed example process 600 for generating a training dataset for training a predictive machine learning model may comprise an algorithm with reference to the Appendix.

In some embodiments, initiating performance of the prediction-based actions include performing load balancing operations for a post-prediction system. For example, various embodiments of the present disclosure make important technical contributions to improving resource-usage efficiency of post-prediction systems by using hybrid reason code predictions to set the number of allowed computing entities used by the noted post-prediction systems. For example, in some embodiments, a predictive data analysis computing entity determines V vulnerability classifications for S source code data objects based on the S source code-wide embedded representations for the S document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the S source code data objects. For example, in some embodiments, the number of computing entities needed to perform post-prediction processing operations (e.g., automated investigation operations) with respect to S source code data objects can be determined based on the output of the equation:

$$R = \text{ceil}\left(\sum_{k}^{k=K} ur_k\right),$$

where R is the predicted number of computing entities needed to perform post-prediction processing operations with respect to the S source code data objects, ceil(.) is a ceiling function that returns the closest integer that is greater than or equal to the value provided as the input parameter of the ceiling function, k is an index variable that iterates over K source code data objects among the S source code data objects that are associated with affirmative classifications, and $ur_k$ is the estimated resource utilization ratio for a kth source code data objects that may be determined based on a count of functions/variables/in the kth source code data object. In some embodiments, once R is generated, the predictive data analysis computing entity can use R to perform operational load balancing for a server system that is configured to perform post-prediction processing operations (e.g., automated investigation operations) with respect to S source code data objects. This may be done by allocating computing entities to the post-prediction processing operations if the number of currently-allocated computing entities is below R, and deallocating currently-allocated computing entities if the number of currently-allocated computing entities is above R.

Accordingly, as described above, various embodiments of the present disclosure make important technical contributions to improving vulnerability scanning systems by using a predictive machine learning model-based system that is trained to detect multiclass vulnerabilities and locate precise locations of vulnerabilities in source code based on identification and capture of syntax and rich semantics of source code. This approach improves training speed, accuracy, and training efficiency of training predictive machine learning models used in vulnerability scanning systems. It is well-understood in the relevant art that there is typically a tradeoff between predictive accuracy, scalability, precision, and training speed, such that it is trivial to improve training speed by reducing predictive accuracy. Thus, the real challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, accuracy and/or speed of training machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation. It should be understood that the examples and embodiments in the Appendix are also for illustrative purposes and are non-limiting in nature. The contents of the Appendix are incorporated herein by reference in their entirety.

VII. EXAMPLES

Example 1. A computer-implemented method comprising: receiving, by one or more processors, one or more source code files; for each of the one or more source code files, matching, by the one or more processors, source code from the one or more source code files to one or more program slices by parsing the source code and mapping one or more portions of the source code to the one or more program slices, wherein each of the one or more program slices comprises one or more program statements associated with one or more vulnerabilities; generating, by the one or more processors and using a predictive machine learning model, a vulnerability prediction for each of the one or more source code files, the vulnerability prediction comprising: (a) one or more locations of vulnerable code in the source code based on the matching, and (b) a vulnerability class associated with each location of vulnerable code, wherein: (i) the predictive machine learning model is trained based on a training dataset, and (ii) the training dataset is generated by: (1) receiving one or more training source code files and one or more vulnerability classes associated with the one or more training source code files, (2) receiving one or more syntax features for each of the one or more vulnerability classes, (3) determining a program slicing criterion based on the one or more syntax features, (4) extracting the one or more program slices from the one or more training source code files based on the program slicing criterion, and (5) labeling the one or more program slices with the one or more vulnerability classes; and initiating, by the one or more processors, the performance of one or more prediction-based actions based on the vulnerability prediction.

Example 2. The computer-implemented method of any of the preceding examples, wherein determining the program slicing criterion further comprises determining one or more potential vulnerability candidates by performing static analysis on one or more program statements associated with the one or more training source code files and matching the one or more program statements associated with the one or more training source code files with the one or more syntax features.

Example 3. The computer-implemented method of any of the preceding examples, wherein the static analysis comprises generating, for each of the one or more training source code files, at least one of: a program dependency graph, a data dependency graph, and a control dependency graph.

Example 4. The computer-implemented method of any of the preceding examples, wherein the one or more syntax features comprises application programming interface (API) or library calls, array declarations, pointer declarations, or operators in expression.

Example 5. The computer-implemented method of any of the preceding examples, wherein extracting the one or more program slices comprises generating a source code subset, the source code subset comprising the one or more program statements from the one or more training source code files contributing to the one or more vulnerabilities.

Example 6. The computer-implemented method of any of the preceding examples, wherein the training dataset comprises the one or more program slices assigned with labels associated with the one or more vulnerability classes.

Example 7. The computer-implemented method of any of the preceding examples, wherein the training dataset is further generated by replacing names of functions and variables in the one or more program slices with symbolic names.

Example 8. A computing apparatus comprising memory and one or more processors communicatively coupled to the memory, the one or more processors configured to: receive one or more source code files; for each of the one or more source code files, match source code from the one or more source code files to one or more program slices by parsing the source code and mapping one or more portions of the source code to the one or more program slices, wherein each of the one or more program slices comprises one or more program statements associated with one or more vulnerabilities; generate, using a predictive machine learning model, a vulnerability prediction for each of the one or more source code files, the vulnerability prediction comprising: (a) one or more locations of vulnerable code in the source code based on the matching, and (b) a vulnerability class associated with each location of vulnerable code, wherein: (i) the predictive machine learning model is trained based on a training dataset, and (ii) the training dataset is generated by: (1) receiving one or more training source code files and one or more vulnerability classes associated with the one or more training source code files, (2) receiving one or more syntax features for each of the one or more vulnerability classes, (3) determining a program slicing criterion based on the one or more syntax features, (4) extracting the one or more program slices from the one or more training source code files based on the program slicing criterion, and (5) labeling the one or more program slices with the one or more vulnerability classes; and initiate the performance of one or more prediction-based actions based on the vulnerability prediction.

Example 9. The computing apparatus of any of the preceding examples, wherein determining the program slicing criterion further comprises determining one or more potential vulnerability candidates by performing static analysis on one or more program statements associated with the one or more training source code files and matching the one or more program statements associated with the one or more training source code files with the one or more syntax features.

Example 10. The computing apparatus of any of the preceding examples, wherein the static analysis comprises generating, for each of the one or more training source code files, at least one of: a program dependency graph, a data dependency graph, and a control dependency graph.

Example 11. The computing apparatus of any of the preceding examples, wherein the one or more syntax features comprises application programming interface (API) or library calls, array declarations, pointer declarations, or operators in expression.

Example 12. The computing apparatus of any of the preceding examples, wherein extracting the one or more program slices comprises generating a source code subset, the source code subset comprising the one or more program statements from the one or more training source code files contributing to the one or more vulnerabilities.

Example 13. The computing apparatus of any of the preceding examples, wherein the training dataset comprises the one or more program slices assigned with labels associated with the one or more vulnerability classes.

Example 14. The computing apparatus of any of the preceding examples, wherein the training dataset is further generated by replacing names of functions and variables in the one or more program slices with symbolic names.

Example 15. One or more non-transitory computer-readable storage media including instructions that, when executed by one or more processors, cause the one or more processors to: receive one or more source code files; for each of the one or more source code files, match source code from the one or more source code files to one or more program slices by parsing the source code and mapping one or more portions of the source code to the one or more program slices, wherein each of the one or more program slices comprises one or more program statements associated with one or more vulnerabilities; generate, using a predictive machine learning model, a vulnerability prediction for each of the one or more source code files, the vulnerability prediction comprising: (a) one or more locations of vulnerable code in the source code based on the matching, and (b) a vulnerability class associated with each location of vulnerable code, wherein: (i) the predictive machine learning model is trained based on a training dataset, and (ii) the training dataset is generated by: (1) receiving one or more training source code files and one or more vulnerability classes associated with the one or more training source code files, (2) receiving one or more syntax features for each of the one or more vulnerability classes, (3) determining a program slicing criterion based on the one or more syntax features, (4) extracting the one or more program slices from the one or more training source code files based on the program slicing criterion, and (5) labeling the one or more program slices with the one or more vulnerability classes; and initiate the performance of one or more prediction-based actions based on the vulnerability prediction.

Example 16. The one or more non-transitory computer-readable storage media of any of the preceding examples, wherein determining the program slicing criterion further comprises determining one or more potential vulnerability candidates by performing static analysis on one or more program statements associated with the one or more training source code files and matching the one or more program statements associated with the one or more training source code files with the one or more syntax features.

Example 17. The one or more non-transitory computer-readable storage media of any of the preceding examples, wherein the static analysis comprises generating, for each of the one or more training source code files, at least one of: a program dependency graph, a data dependency graph, and a control dependency graph.

Example 18. The one or more non-transitory computer-readable storage media of any of the preceding examples, wherein the one or more syntax features comprises application programming interface (API) or library calls, array declarations, pointer declarations, or operators in expression.

Example 19. The one or more non-transitory computer-readable storage media of any of the preceding examples, wherein extracting the one or more program slices comprises generating a source code subset, the source code subset comprising the one or more program statements from the one or more training source code files contributing to the one or more vulnerabilities.

Example 20. The one or more non-transitory computer-readable storage media of any of the preceding examples, wherein the training dataset is further generated by replacing names of functions and variables in the one or more program slices with symbolic names.

APPENDIX

```
Function preProcessData(data, CL) {
   data : source code contains raw data for training
   CL : A set of vulnerability rules/syntax characteristics list
   slicingCriteria : vulnerability candidate from the source code
   train : data having columns 'vulnerability class' and 'text' (slice)
   for each rule in CL do {
      If rule matched in data then
         slicingCriteria.add(matched program statement in data)
   }
   for each SC in slicingCriteria do {
      slice = computeSlice(SC, data)        // semantically relevant code
      train.append(slice, SC.getVulnerabilityClass( ), SC.getSourceCodeFileID( ))
   }
   train.toCSVFormat(train)
   train = train.notNullText( )            // select not null text columns only
   train = train.len_txt > 300             // only row with number of words greater than 300
   train = fit_transform using label encoder
   train = dataCleaning( )                 // remove any special character/extra quotes/extra
   spaces etc. and replace variable/function name as symbolic names
    return train                           // data with columns "vulnerability class", "slice"
                                           and ID to map the slice back to source code file
}
```

The invention claimed is:

1. A computer-implemented method comprising:

receiving, by one or more processors, a source code file;

matching, by the one or more processors, source code from the source code file to a plurality of program slices by parsing the source code and mapping a portion of the source code to a program slice of the plurality of program slices, wherein the program slice comprises a program statement associated with a vulnerability;

generating, by the one or more processors and using a predictive machine learning model, a vulnerability prediction for the source code file, the vulnerability prediction comprising: (a) a location of vulnerable code in the source code based on the matching, and (b) a vulnerability class, of a plurality of vulnerability classes, associated with the vulnerable code in the source code, wherein: (i) the vulnerability prediction indicates whether the source code file increases a susceptibility to a malicious attack, (ii) the predictive machine learning model comprises a multiclass classification machine learning model and is trained based on a training dataset, and (iii) the training dataset is generated by:

(1) receiving a plurality of training source code files and the plurality of vulnerability classes associated with the plurality of training source code files, (2) receiving a plurality of syntax features corresponding to the plurality of vulnerability classes, (3) determining a program slicing criterion based on the plurality of syntax features, (4) extracting a set of program slices from the plurality of training source code files based on the program slicing criterion, wherein one or more program slices of the set of program slices is extracted by performing a forward slice or a backward slice, and (5) labeling the set of program slices with the plurality of vulnerability classes; and initiating, by the one or more processors, one or more prediction-based actions based on the vulnerability prediction.

2. The computer-implemented method of claim 1, wherein:

(i) determining the program slicing criterion further comprises determining a plurality of potential vulnerability candidates by performing static analysis on a plurality of program statements associated with the plurality of training source code files and matching the plurality of program statements associated with the plurality of training source code files with the plurality of syntax features, (ii) the program slicing criterion comprises a set of variables corresponding to a plurality of values that are required to be preserved, (iii) the forward slice comprises a program statement affected by the program slicing criterion, and (iv) the backward slice comprises a program statement that affects the program slicing criterion.

3. The computer-implemented method of claim 2, wherein the static analysis comprises generating, for a training source code file of the plurality of training source code files, at least one of: a program dependency graph, a data dependency graph, and a control dependency graph.

4. The computer-implemented method of claim 3, wherein the program dependency graph comprises a first set of edges representative of data dependencies between one or more program statements in the training source code file and a second set of edges representative of one or more control dependencies between the one or more program statements in the training source code file.

5. The computer-implemented method of claim 1, wherein the plurality of syntax features comprises application programming interface (API) or library calls, array declarations, pointer declarations, or operators in an expression.

6. The computer-implemented method of claim 1, wherein extracting the plurality of program slices comprises generating a source code subset, the source code subset comprising the program statement from the plurality of training source code files contributing to the vulnerability.

7. The computer-implemented method of claim 1, wherein the training dataset comprises the plurality of program slices assigned with labels associated with the plurality of vulnerability classes.

8. The computer-implemented method of claim 1, wherein the location of vulnerable code in the source code further comprises one or more of an indication of a class or a function associated with the vulnerable code or an identifier associated with a source code file comprising the source code.

9. The computer-implemented method of claim 1, wherein initiating the one or more prediction-based actions further comprises:

performing one or more load balancing operations to set a number of allowed computing entities used by a post-prediction system based on the vulnerability prediction.

10. A system comprising:

one or more processors; and at least one memory storing processor-executable instructions that, when executed by any one or more of the one or more processors, causes the one or more processors to perform operations comprising:

receive a source code file;

match source code from the source code file to a plurality of program slices by parsing the source code and mapping a portion of the source code to a program slice of the plurality of program slices, wherein the program slice comprises a program statement associated with a vulnerability;

generate, using a predictive machine learning model, a vulnerability prediction for the source code file, the vulnerability prediction comprising: (a) a location of vulnerable code in the source code based on the matching, and (b) a vulnerability class, of a plurality of vulnerability classes, associated with the vulnerable code in the source code, wherein: (i) the vulnerability prediction indicates whether the source code file increases a susceptibility to a malicious attack, (ii) the predictive machine learning model comprises a multiclass classification machine learning model and is trained based on a training dataset, and (iii) the training dataset is generated by:

(1) receiving a plurality of training source code files and the plurality of vulnerability classes associated with the plurality of training source code files, (2) receiving a plurality of syntax features corresponding to the plurality of vulnerability classes, (3) determining a program slicing criterion based on the plurality of syntax features, (4) extracting a set of program slices from the plurality of training source code files based on the program slicing criterion, wherein one or more program slices of the set of program slices is extracted by performing a forward slice or a backward slice, and (5) labeling the set of program slices with the plurality of vulnerability classes; and initiate one or more prediction-based actions based on the vulnerability prediction.

11. The system of claim 10, wherein (i) determining the program slicing criterion further comprises determining a plurality of potential vulnerability candidates by performing static analysis on a plurality of program statements associated with the plurality of training source code files and matching the plurality of program statements associated with the plurality of training source code files with the plurality of syntax features, (ii) the program slicing criterion comprises a set of variables corresponding to a plurality of values that are required to be preserved, (iii) the forward slice comprises a program statement affected by the program slicing criterion, and (iv) the backward slice comprises a program statement that affects the program slicing criterion.

12. The system of claim 11, wherein the static analysis comprises generating, for a training source code file of the plurality of training source code files, at least one of: a program dependency graph, a data dependency graph, and a control dependency graph.

13. The system of claim 10, wherein the plurality of syntax features comprises application programming interface (API) or library calls, array declarations, pointer declarations, or operators in an expression.

14. The system of claim 10, wherein extracting the plurality of program slices comprises generating a source code subset, the source code subset comprising the program statement from the plurality of training source code files contributing to the vulnerability.

15. The system of claim 10, wherein the training dataset is further generated by replacing names of functions and variables in the plurality of program slices with symbolic names.

16. One or more non-transitory computer-readable storage media including instructions that, when executed by one or more processors, cause the one or more processors to:

receive a source code file;

match source code from the source code file to a plurality of program slices by parsing the source code and mapping a portion of the source code to a program slice of the plurality of program slices, wherein the program slice comprises a program statement associated with a vulnerability;

generate, using a predictive machine learning model, a vulnerability prediction for the source code file, the vulnerability prediction comprising: (a) a location of vulnerable code in the source code based on the matching, and (b) a vulnerability class, of a plurality of vulnerability classes, associated with the vulnerable code in the source code, wherein: (i) the vulnerability prediction indicates whether the source code file increases a susceptibility to a malicious attack, (ii) the predictive machine learning model comprises a multi-class classification machine learning model and is trained based on a training dataset, and (iii) the training dataset is generated by:

(1) receiving a plurality of training source code files and the plurality of vulnerability classes associated with the plurality of training source code files, (2) receiving a plurality of syntax features corresponding to the plurality of vulnerability classes, (3) determining a program slicing criterion based on the plurality of syntax features, (4) extracting a set of program slices from the plurality of training source code files based on the program slicing criterion, wherein one or more program slices of the set of program slices is extracted by performing a forward slice or a backward slice, and (5) labeling the set of program slices with the plurality of vulnerability classes; and initiate one or more prediction-based actions based on the vulnerability prediction.

17. The one or more non-transitory computer-readable storage media of claim 16, wherein:

(i) determining the program slicing criterion further comprises determining a plurality of potential vulnerability candidates by performing static analysis on a plurality of program statements associated with the plurality of training source code files and matching the plurality of program statements associated with the plurality of training source code files with the plurality of syntax features, (ii) the program slicing criterion comprises a set of variables corresponding to a plurality of values that are required to be preserved, (iii) the forward slice comprises a program statement affected by the program slicing criterion, and (iv) the backward slice comprises a program statement that affects the program slicing criterion.

18. The one or more non-transitory computer-readable storage media of claim 17, wherein the static analysis comprises generating, for a training source code file of the plurality of training source code files, at least one of: a program dependency graph, a data dependency graph, and a control dependency graph.

19. The one or more non-transitory computer-readable storage media of claim 16, wherein extracting the plurality of program slices comprises generating a source code subset, the source code subset comprising the program statement from the plurality of training source code files contributing to the vulnerability.

20. The one or more non-transitory computer-readable storage media of claim 16, wherein the training dataset is further generated by replacing names of functions and variables in the plurality of program slices with symbolic names.

* * * * *